United States Patent
Hofacker

(10) Patent No.: US 7,060,778 B2
(45) Date of Patent: Jun. 13, 2006

(54) YTTERBIUM(III) ACETYLACETONATE AS A CATALYST FOR THE PREPARATION OF ALIPHATIC OLIGOCARBONATE POLYOLS

(75) Inventor: Steffen Hofacker, Odenthal (DE)

(73) Assignee: Bayer Materialscience AG, Leverkusen (DE)

( * ) Notice: Subject to any disclaimer, the term of this patent is extended or adjusted under 35 U.S.C. 154(b) by 0 days.

(21) Appl. No.: 10/842,402

(22) Filed: May 10, 2004

(65) Prior Publication Data

US 2004/0230069 A1 Nov. 18, 2004

(30) Foreign Application Priority Data

May 12, 2003 (DE) ................... 103 21 149

(51) Int. Cl.
*C08G 18/44* (2006.01)

(52) U.S. Cl. ................ 528/85; 528/280; 528/281; 558/265; 558/266; 252/182.22; 252/182.24

(58) Field of Classification Search ............ 528/85, 528/370, 371; 558/265, 266; 252/182.22, 252/182.24

See application file for complete search history.

(56) References Cited

U.S. PATENT DOCUMENTS

| | | | | |
|---|---|---|---|---|
| 3,631,200 A | 12/1971 | Nehring et al. | ............. | 260/463 |
| 4,105,641 A | 8/1978 | Buysch et al. | ............. | 526/712 |
| 4,533,729 A * | 8/1985 | Newland et al. | ............. | 528/371 |
| 4,978,691 A | 12/1990 | Murai et al. | ............. | 521/172 |
| 5,208,297 A | 5/1993 | Ford et al. | ............. | 525/415 |
| 5,288,839 A | 2/1994 | Greco | ............. | 528/204 |
| 6,566,563 B1 | 5/2003 | Westfechtel et al. | ........ | 568/852 |
| 2002/0082363 A1 | 6/2002 | Zhao et al. | ............. | 525/523 |
| 2003/0009047 A1 | 1/2003 | Tillack et al. | ............. | 558/265 |

FOREIGN PATENT DOCUMENTS

| | | |
|---|---|---|
| DE | 857 948 | 12/1952 |
| DE | 1 012 557 | 7/1957 |
| DE | 1 955 902 | 5/1971 |
| JP | 03273017 | * 12/1991 |

* cited by examiner

*Primary Examiner*—Rachel Gorr
(74) *Attorney, Agent, or Firm*—Joseph C. Gil; Lyndanne M. Whalen

(57) ABSTRACT

Ytterbium(III) acetylacetonate is used as a catalyst for the preparation of aliphatic oligocarbonate polyols by transesterification of at least one organic carbonate with at least one aliphatic polyol.

9 Claims, No Drawings

YTTERBIUM(III) ACETYLACETONATE AS A CATALYST FOR THE PREPARATION OF ALIPHATIC OLIGOCARBONATE POLYOLS

BACKGROUND OF THE INVENTION

The present invention relates to the use of ytterbium(III) acetylacetonate as a catalyst for the preparation of aliphatic oligocarbonate polyols by transesterification of an organic carbonate with an aliphatic polyol, to polyols produced using such catalyst and to prepolymers produced from such polyols.

Oligocarbonate polyols are important raw materials, for example, in the production of plastics materials, coatings and adhesives. They are reacted, for example, with isocyanates, epoxides, (cyclic) esters, acids or acid anhydrides (DE-A 1 955 902). They can in principle be prepared from an aliphatic polyol by reaction with phosgene (for example, DE-A 1 595 446), bis-chlorocarbonic ester (for example, DE-A 857 948), diaryl carbonate (for example, DE-A 1 01 2557), cyclic carbonate (for example, DE-A 2 523 352) or dialkyl carbonate (for example, WO 2003/2630).

It is known that when aryl carbonates such as diphenyl carbonate are reacted with aliphatic polyols such as 1,6-hexanediol a satisfactory reaction conversion can be achieved solely by removing the liberated alcoholic compound (for example, phenol) during the course of the equilibrium shift of the reaction (for example, EP-A 0 533 275). However, if alkyl carbonates (for example, dimethyl carbonate) are used, transesterification catalysts such as alkali metals or alkaline earth metals as well as oxides, alkoxides, carbonates, borates thereof or salts of organic acids (for example, WO 2003/2630) are frequently used.

Moreover, tin or organotin compounds such as bis(tributyltin) oxide, dibutyltin laurate or alternatively dibutyltin oxide (DE-A 2 523 352) as well as compounds of titanium such as titanium tetrabutylate, titanium tetraisopropylate or titanium dioxide are preferably used as transesterification catalysts (for example, EP-B 0 343 572 and WO 2003/2630).

The transesterification catalysts known from the prior art for the preparation of aliphatic oligocarbonate polyols by reacting alkyl carbonates with aliphatic polyols, however, have some disadvantages.

Organotin compounds have recently been recognized as potential human carcinogens. They are consequently undesirable constituents and previously preferred catalyst compounds such as bis(tributyltin) oxide, dibutyltin oxide or dibutyltin laurate persist in secondary products of the oligocarbonate polyols. When strong bases such as alkali metals or alkaline earth metals or alkoxides thereof are used, it is necessary to neutralize the products in an additional process step after completion of the oligomerization. If, on the other hand, Ti compounds are used as catalysts, undesirable discoloration (yellowing) of the resulting product may occur during storage, which is brought about by the presence of Ti(III) compounds alongside Ti(IV) compounds and/or by the tendency of titanium to form complexes.

In addition to this undesirable characteristic of discoloration, when the hydroxyl-terminating oligocarbonates are reacted further as a raw material in the production of a polyurethane, titanium-containing catalysts have high activity vis-à-vis compounds which contain isocyanate groups. This characteristic is particularly conspicuous when the titanium-catalyzed oligocarbonate polyols are reacted with aromatic (poly)isocyanates at elevated temperature, such as is the case, for example, in the production of pouring elastomers or thermoplastic polyurethanes (TPUs). This disadvantage can even result in shortening of the pot life or reaction time of the reaction mixture as a result of utilisation of titanium-containing oligocarbonate polyols, to such an extent that it is no longer possible to use such oligocarbonate polyols for these fields of application. In order to avoid this disadvantage, the transesterification catalyst which persists in the product is as far as possible inactivated in at least one additional production step once the synthesis is concluded.

EP-B 1 091 993 teaches inactivation by the addition of phosphoric acid, whereas U.S. Pat. No. 4,891,421 proposes inactivation by hydrolysis of the titanium compounds, with a corresponding quantity of water being added to the product and being removed again from the product by distillation once deactivation has been achieved.

It has not furthermore been possible with the catalysts used hitherto to reduce the reaction temperature, which is normally between 150° C. and 230° C., in order largely to avoid the formation of by-products such as ethers or vinyl groups, which may arise at elevated temperature. These undesirable terminal groups act as chain terminators for subsequent polymerization reactions. For example, in the case of the polyurethane reaction with polyfunctional (poly) isocyanates, they lead to a lowering of the network density and hence to poorer product characteristics (for example, solvent or acid resistance).

Moreover, oligocarbonate polyols which have been prepared with the aid of the catalysts known from the prior art have high ether group (for example, methylether, hexylether, etc.) contents. However, these ether groups in the oligocarbonate polyols lead, for example, to unsatisfactory hot air resistance of pouring elastomers which are based on such oligocarbonate polyols, because ether compounds in the material are broken down under these conditions, thus leading to material failure.

SUMMARY OF THE INVENTION

The object of the present invention was therefore to provide suitable catalysts for the transesterification reaction of organic carbonates, in particular dialkyl carbonates, with aliphatic polyols for the preparation of aliphatic oligocarbonate polyols, which do not have the disadvantages indicated above.

It has now been found that ytterbium(III) acetylacetonate is such a catalyst.

DETAILED DESCRIPTION OF THE INVENTION

In the process of the present invention, ytterbium(III) acetylacetonate is used as a transesterification catalyst for the preparation of aliphatic oligocarbonate polyols having a number average molecular weight of from 500 to 5000 g/mol from aliphatic polyols and organic carbonates. The resultant aliphatic oligocarbonate polyols are particularly useful for the production of isocyanate-terminated prepolymers and polyurethanes.

In the process of the present invention, the catalyst may be used either as a solid or in solution—for example, dissolved in one of the educts.

The concentration of the catalyst used according to the invention is from 0.01 ppm to 10000 ppm, preferably from 0.1 ppm to 5000 ppm, most preferably from 0.1 ppm to 1000 ppm, in relation to the total mass of the educts used.

The reaction temperature during the transesterification reaction is from 40° C. to 250° C., preferably 60° C. to 230° C., most preferably 80° C. to 210° C.

The transesterification reaction may be carried out at atmospheric pressure or at reduced or elevated pressure of from $10^{-3}$ to $10^3$ bar.

Any of the known aryl, alkyl or alkylene carbonates, particularly those which are readily available, may be used as the organic carbonate in the process of the present invention. Examples of specific carbonates which are suitable for use in the present invention include: diphenyl carbonate (DPC), dimethyl carbonate (DMC), diethyl carbonate (DEC), ethylene carbonate, etc.

Diphenyl carbonate, dimethyl carbonate or diethyl carbonate are preferably used. Diphenyl carbonate or dimethyl carbonate are most preferably used.

Aliphatic alcohols having 2 to 100 C atoms (linear, cyclic, branched, unbranched, saturated or unsaturated) having an OH functionality of $\geqq 2$ (primary, secondary or tertiary) may be used as a reaction partner for the organic carbonate. Specific examples of suitable aliphatic alcohols include: ethylene glycol, 1,3-propylene glycol, 1,3-butanediol, 1,4-butanediol, 1,5-pentanediol, 1,6-hexanediol, 2-ethylhexanediol, 3-methyl-1,5-pentanediol, cyclohexanedimethanol, trimethylolpropane, pentaerythritol, dimer diol, diethylene glycol, etc.

Likewise, polyols may be used in the practice of the present invention. Suitable polyols include those which are obtainable from a ring-opening reaction between a lactone or epoxide and an aliphatic alcohol (linear, cyclic, branched, unbranched, saturated or unsaturated) having an OH functionality of $\geqq 2$ (primary, secondary or tertiary), for example the product of an addition reaction between ε-caprolactone and 1,6-hexanediol or ε-caprolactone and trimethylolpropane, as well as mixtures thereof.

Finally, mixtures of various polyols mentioned above may also be used as educts.

Aliphatic or cycloaliphatic branched or unbranched, primary or secondary polyols having an OH functionality of $\geqq 2$ are preferred. Aliphatic branched or unbranched primary polyols having a functionality of $\geqq 2$ are particularly preferred.

When using the catalyst in accordance with the present invention, it is possible to dispense with a final deactivation of the transesterification catalyst by, for example, the addition of a sequestering agent such as, for example, phosphoric acid, dibutyl phosphate, oxalic acid etc., or a precipitation reagent such as, for example, water. The resulting ytterbium-containing oligocarbonate polyol(s) are consequently suitable as raw materials, for example, for polyurethane preparation, without further treatment.

The present invention also provides the oligocarbonate diols having a number average molecular weight of from 500 to 5000 g/mol, which are obtainable by transesterification of an organic carbonate with an aliphatic polyol in the presence of ytterbium(III) acetylacetonate, and the NCO-terminated prepolymers which are obtainable from the oligocarbonate diol(s) by reaction with organic (poly)isocyanate(s) in stoichiometric excess.

The oligocarbonate diols which are prepared in the presence of ytterbium(III) acetylacetonate have a lower ether group content than oligocarbonate diols which have been prepared with prior art catalysts. This has a direct influence on the characteristics of the NCO-terminating prepolymers produced therefrom. These show storage stability which is superior to that of the prepolymers prepared with the prior art oligocarbonate diols. Moreover, pouring elastomers prepared from these oligocarbonate diols have higher hot air resistance.

It has also been found that ytterbium compounds, in particular ytterbium(III) acetylacetonate, are also advantageous for the catalysis of other esterification or transesterification reactions, for example for the preparation of polyesters or polyacrylates. The catalyst can then persist in the product during further reactions because it exerts no negative influence on the reaction of the polyol(s) with polyisocyanate(s).

EXAMPLES

Example 1

Dimethyl carbonate (3.06 g) and 1-hexanol (6.94 g) in a molar ratio of 1:2 were mixed together with in each case a constant quantity ($5.7 \times 10^{-6}$ mol) of a catalyst (see Table 1) in a 20 ml rolled flange glass vessel, which was closed with a natural rubber septum including a gas outlet. If the catalyst used was present at room temperature in solid aggregate state, it was first dissolved in one of the educts. The reaction mixture was heated for 6 hours to 80° C., with stirring. After cooling to room temperature, analysis of the product spectrum was performed by gas chromatography, optionally coupled with mass spectrometric examination. The reaction product contents, namely methylhexyl carbonate or dihexyl carbonate, which can be taken as a measure of the activity of the transesterification catalyst used, were quantified by integration of the respective gas chromatograms. The results of these activity investigations are shown in Table 1.

TABLE 1

Catalysts used and reaction product contents

| No. | Catalyst | Methylhexyl carbonate content [area %] | Dihexyl carbonate content [area %] | Sum of contents [area %] |
|---|---|---|---|---|
| 1 | No catalyst | 4.0 | 0.1 | 4.1 |
| 2 | Dibutyltin oxide | 5.1 | 0.2 | 5.3 |
| 3 | Dibutyltin laurate | 3.4 | 0.1 | 3.5 |
| 4 | Bis(tributyltin) oxide | 3.7 | 0.0 | 3.7 |
| 5 | Titanium tetraisopropylate | 1.9 | 0.0 | 1.9 |
| 6 | Magnesium carbonate | 2.1 | 0.1 | 2.2 |
| 7 | Ytterbium(III) acetylacetonate | 23.5 | 5.3 | 28.8 |

Example 2

Dimethyl carbonate (4.15 g) and 1,6-hexanediol (5.85 g) were mixed together with in each case a constant quantity ($5.7 \times 10^{-6}$ mol) of a catalyst (see Table 2) in a 20 ml rolled flange glass vessel, which was closed with a natural rubber septum including a gas outlet. The molar ratio of the dimethyl carbonate and 1,6-hexanediol was selected such that when the reaction was complete an aliphatic oligocarbonate diol having an average molar mass of 2000 g/mol was obtained. If the catalyst used was present at room temperature in solid aggregate state, it was first dissolved in one of the educts. The reaction mixture was heated for 6 hours to 80° C., with stirring. After cooling to room temperature, the contents of the targeted reaction products (for example monoesters, diesters, oligocarbonate polyols), which can be taken as a measure of the activity of the transesterification catalyst used, were first identified with the aid of gas chromatographic and mass spectrometric methods and then quantified by integration of the respective gas chromatograms. The results of these activity investigations are shown in Table 2.

TABLE 2

Catalysts used and reaction product contents

| No. | Catalyst | Reaction product content [area %] |
|---|---|---|
| 1 | No catalyst | 4.8 |
| 2 | Dibutyltin oxide | 8.3 |
| 3 | Dibutyltin laurate | 3.3 |
| 4 | Bis(tributyltin) oxide | 3.9 |
| 5 | Titanium tetraisopropylate | 1.6 |
| 6 | Magnesium carbonate | 4.5 |
| 7 | Ytterbium(III) acetylacetonate | 37.6 |

Example 3

Preparation of an aliphatic oligocarbonate diol with ytterbium(III) acetylacetonate 1759 g 1,6-hexanediol were introduced with 0.02 g ytterbium(III) acetylacetonate into a 5 liter pressure reactor equipped with a distillation head, a stirrer and a receiver. A nitrogen pressure of 2 bar was applied, and the contents were heated to 160° C. 1245.5 g dimethyl carbonate were then introduced within 3 h, with the pressure simultaneously rising to 3.9 bar. The reaction temperature was then raised to 185° C. and the reaction mixture was stirred for 1 h. Finally, a further 1245.5 g dimethyl carbonate were introduced within 3 h, with the pressure rising to 7.5 bar. After completion of the introduction, stirring was continued for a further 2 h, with the pressure rising to 8.2 bar. Throughout the transesterification process, the path to the head of the distillation apparatus and the receiver was open at all times, such that methanol arising as a mixture with dimethyl carbonate could distill off. The reaction mixture was finally depressurized to standard pressure within 15 min, the temperature was reduced to 150° C., and distillation continued at this temperature for one further hour. In order to remove excess dimethyl carbonate and methanol, as well as to unblock (activate) the terminal OH groups, the pressure was then reduced to 10 mbar. After two hours, the temperature was finally raised to 180° C. within 1 h and held for a further 4 hours. The resulting oligocarbonate diol had an OH value of 5 mg KOH/g.

The reaction batch was ventilated, 185 g 1,6-hexanediol were added, and the batch was heated to 180° C. at standard pressure for 6 hours. The pressure was then reduced to 10 mbar at 180° C. for 6 h.

After ventilation and cooling of the reaction batch to room temperature, a colorless, waxy oligocarbonate diol having the following characteristic values was obtained: $M_n$=2000 g/mol; OH value=56.5 mg KOH/g; methylether content: <0.1 wt. %; viscosity: 2800 mPas at 75° C.

Example 4 (Comparison)

Preparation of an aliphatic oligocarbonate diol with use of a catalyst known from the prior art.

1759 g 1,6-hexanediol were introduced with 0.02 g titanium tetraisopropylate into a 5 liter pressure reactor equipped with a distillation head, a stirrer and a receiver. A nitrogen pressure of 2 bar was applied, and the contents were heated to 160° C. 622.75 g dimethyl carbonate were introduced within 1 h, with the pressure simultaneously rising to 3.9 bar. The reaction temperature was then raised to 180° C. and a further 622.75 g dimethyl carbonate were introduced within 1 h. Finally a further 1245.5 g dimethyl carbonate were introduced at 185° C. within 2 h, with the pressure rising to 7.5 bar. After completion of the introduction, stirring took place at this temperature for one further hour. Throughout the transesterifi-cation process, the path to the head of the distillation apparatus and the receiver was open at all times, so that methanol arising as a mixture with dimethyl carbonate could distill off. The reaction mixture was finally depressurized to standard pressure within 15 minutes, the temperature was reduced to 160° C., and distillation continued at this temperature for one further hour. In order to remove excess methanol and dimethyl carbonate, as well as to unblock (activate) the terminal OH groups, the pressure was then reduced to 15 mbar. After a further 4 hours of distillation under these conditions, the reaction batch was ventilated. The resulting oligocarbonate diol had an OH value of 116 mg KOH/g. 60 g dimethyl carbonate were then added to the reaction batch, which was heated to 185° C. at a pressure of 2.6 bar for 6 h.

The pressure was then reduced to 15 mbar at 185° C. for 8 h. After ventilation and treatment of the reaction product with 0.04 g dibutyl phosphate as a catalyst deactivator, as well as cooling of the reaction batch to room temperature, a colorless, waxy oligocarbonate diol having the following characteristic values was obtained: $M_n$=2000 g/mol; OH value=56.5 mg KOH/g; methylether content: 3.8 wt. %; viscosity: 2600 mPas at 75° C.

The ether content of the oligocarbonate diol obtained in Example 3 was markedly lower than that of the oligocarbonate diol obtained in Example 4. This had a direct influence on the hot air resistance of pouring elastomers produced from these polyols.

Example 5

Use of the aliphatic oligocarbonate diol from Example 3 as a raw material for the preparation of a polyurethane prepolymer.

50.24 g diphenylmethane-4,4'-diisocyanate were introduced at 80° C. into a 250 ml three-necked flask equipped with a stirrer and a reflux condenser, and 99.76 g of aliphatic oligocarbonate diol from Example 3 heated to 80° C. were added slowly under a nitrogen atmosphere (equivalent ratio of isocyanate to polyol=1.00:0.25). The flask contents were stirred for 30 minutes after completion of the addition.

A liquid, highly-viscous polyurethane prepolymer having the following characteristic values was obtained: NCO content: 8.50 wt. %; viscosity: 6560 mPas at 70° C.

The prepolymer was then stored at 80° C. for a further 72 h, after which the viscosity and NCO content were checked.

After storage, the liquid product had the following characteristic data: NCO content: 8.40 wt. %; viscosity: 6980 mPas at 70° C. (corresponds to a 6.4% viscosity increase);

Example 6 (Comparison)

Use of the aliphatic oligocarbonate diol from Example 4 as a raw material for the preparation of a polyurethane prepolymer.

50.24 g diphenylmethane-4,4'-diisocyanate were introduced at 80° C. into a 250 ml three-necked flask equipped with a stirrer and a reflux condenser, and 99.76 g of aliphatic oligocarbonate diol from Example 4 heated to 80° C. were added slowly under a nitrogen atmosphere (equivalent ratio of isocyanate to polyol=1.00:0.25). The flask contents were stirred for 30 minutes after completion of the addition.

A liquid, highly-viscous polyurethane prepolymer having the following characteristic values was obtained: NCO content: 8.5 wt. %; viscosity: 5700 mPas at 70° C.

The prepolymer was then stored at 80° C. for a further 72 h, after which the viscosity and NCO content were checked. A solid (gelled) product was obtained after storage.

As is apparent from a comparison of the viscosities of Examples 5 and 6, the viscosity of the prepolymer from Example 6 increases so substantially during storage that it passes into the gel state, while the viscosity increase in Example 5, at 6.4%, was well below the critical 20% mark.

It therefore becomes clear that aliphatic oligocarbonate polyols which have been prepared with use of the catalyst ytterbium(III) acetylacetonate in accordance with the present invention have a markedly lower and consequently more advantageous activity as regards the reaction with (poly)isocyanates to give (poly)urethanes than those that have been prepared with the aid of catalysts known from the prior art, even when the known catalysts were "inactivated".

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of an aliphatic oligocarbonate polyol having a number average molecular weight of from 500 to 5000 g/mol comprising reacting an aliphatic polyol with an organic carbonate in the presence of an ytterbium(III) acetylacetonate transesterification catalyst.

2. The process of claim 1 in which the organic carbonate is a dimethyl carbonate, a diethyl carbonate, a diphenyl carbonate or any combination thereof.

3. The process of claim 1 in which the organic carbonate is a dimethyl carbonate.

4. The process of claim 1 in which the aliphatic polyol is the product of an addition reaction between (a) an aliphatic diol and (b) a lactone or epoxide.

5. The process of claim 1 in which the aliphatic polyol is 1,6-hexanediol, a ring-opening product of 1,6-hexanediol and ε-caprolactone or a mixture thereof.

6. The process of claim 1 in which the catalyst concentration is from 0.01 ppm to 10000 ppm, based on the total mass of educts utilized.

7. The process of claim 1 in which the methylether content of the aliphatic oligocarbonate polyol is less than or equal to 0.2 wt. %.

8. An ytterbium-containing oligocarbonate diol having a number average molecular weight of from 500 to 5000 g/mol produced by the process of claim 1.

9. An NCO-terminated prepolymer produced by reacting a stoichiometric excess of an organic (poly)isocyanate with the ytterbium-containing oligocarbonate diol of claim 8.

* * * * *